United States Patent
Sethi et al.

(10) Patent No.: US 11,954,004 B2
(45) Date of Patent: Apr. 9, 2024

(54) DETECTION OF MODIFICATION TO SYSTEM CONFIGURATION

(71) Applicant: Dell Products L.P., Round Rock, TX (US)

(72) Inventors: Parminder Singh Sethi, Ludhiana (IN); Lakshmi Saroja Nalam, Bangalore (IN); Durai S. Singh, Chennai (IN)

(73) Assignee: Dell Products L.P., Round Rock, TX (US)

( * ) Notice: Subject to any disclaimer, the term of this patent is extended or adjusted under 35 U.S.C. 154(b) by 127 days.

(21) Appl. No.: 17/505,901

(22) Filed: Oct. 20, 2021

(65) Prior Publication Data

US 2023/0124517 A1 Apr. 20, 2023

(51) Int. Cl.
G06F 11/30 (2006.01)

(52) U.S. Cl.
CPC ...... *G06F 11/3058* (2013.01); *G06F 11/3024* (2013.01)

(58) Field of Classification Search
CPC .. G06F 11/3055; G06F 11/30; G06F 11/3086; G06F 11/3089
See application file for complete search history.

(56) References Cited

U.S. PATENT DOCUMENTS

| | | | | |
|---|---|---|---|---|
| 5,982,899 A * | 11/1999 | Probst | | G06F 21/572 713/1 |
| 2004/0034813 A1 * | 2/2004 | Chaboud | | G06F 21/57 714/27 |
| 2004/0078497 A1 * | 4/2004 | Nalawadi | | G06F 21/575 710/8 |
| 2006/0200856 A1 * | 9/2006 | Salowey | | H04L 9/32 726/5 |
| 2007/0113090 A1 * | 5/2007 | Villela | | H04L 9/3247 713/170 |
| 2013/0346260 A1 * | 12/2013 | Jubran | | G06Q 10/087 705/28 |

(Continued)

OTHER PUBLICATIONS

Dell Technologies, "Using BIOSConnect to Recover SupportAssist OS Recovery Partition," https://www.dell.com/support/kbdoc/en-th/000177771/using-bioconnect-to-recover-supportassist-os-recovery-partition, Dec. 5, 2020, 9 pages.

(Continued)

*Primary Examiner* — Raymond N Phan
(74) *Attorney, Agent, or Firm* — Ryan, Mason & Lewis, LLP (57) ABSTRACT

Techniques for detecting a modification to a configuration of a system are disclosed. For example, a method comprises the step of collecting a first data set for a system at a first time instance, wherein the first data set comprises inventory data for a configuration of the system present at the first time instance. The method compares the first data set to a second data set, wherein the second data set comprises inventory data for a configuration of the system present at a second time instance. The method obtains a third data set based on the comparison of the first data set and the second data set, wherein the third data set comprises data indicative of any differences between the inventory data for the configuration of the system present at the first time instance and the inventory data for the configuration of the system present at the second time instance.

20 Claims, 7 Drawing Sheets

(56) References Cited

U.S. PATENT DOCUMENTS

| | | | | |
|---|---|---|---|---|
| 2014/0101467 A1* | 4/2014 | Jubran | ................. | H04L 41/344 |
| | | | | 709/224 |
| 2015/0149754 A1* | 5/2015 | Hu | ..................... | G06F 11/2284 |
| | | | | 713/2 |
| 2018/0314507 A1* | 11/2018 | Chien | ...................... | G06F 8/65 |
| 2021/0297330 A1* | 9/2021 | Li | .......................... | H04L 41/28 |
| 2022/0207145 A1* | 6/2022 | Young | .................. | G06F 21/575 |

OTHER PUBLICATIONS

Dell Technologies, "Restore Your System Using Dell SupportAssist OS Recovery," https://www.dell.com/support/kbdoc/en-us/000177401/restore-your-system-using-dell-supportassist-os-recovery, Dec. 5, 2020, 7 pages.

Dell Technologies "SupportAssist for PCs and Tablets," User Guide, Jun. 2015, 14 pages.

Dell Technologies "Dell SupportAssist for Client Systems," Jul. 2016, 2 pages.

Dell Technologies "SupportAssist for PCs and Tablets," Frequently Asked Questions, Nov. 20, 2020, 6 pages.

Dell EMC, "Dell EMC SupportAssist Enterprise 2.x—Guide and Download," Article No. 179530, https://www.dell.com/support/kbdoc/en-us/000179530/dell-emc-supportassist-enterprise-2-x-guide-and-download, Dec. 5, 2020, 7 pages.

* cited by examiner

```
PS C:\Users\lakshmi_nalam> Get-WMIObject win32_physicalmedia
_GENUS              : 2
_CLASS              : Win32_PhysicalMedia
_SUPERCLASS         : CIM_PhysicalMedia
_DYNASTY            : CIM_ManagedSystemElement
_RELPATH            : Win32_PhysicalMedia.Tag="\\\\.\\PHYSICALDRIVE0"
_PROPERTY_COUNT     : 23
_DERIVATION         : {CIM_PhysicalMedia, CIM_PhysicalComponent, CIM_PhysicalElement,
                      CIM_ManagedSystemElement}
_SERVER             : W10BZMM6S2
_NAMESPACE          : root\cimv2
_PATH               : \\W10BZMM6S2\root\cimv2:Win32_PhysicalMedia.Tag=
                      "\\\\.\\PHYSICALDRIVE0"
Capacity            :
Caption             :
CleanerMedia        :
CreationClassName   :
Description         :
HotSwappable        :
InstallDate         :
Manufacturer        :
MediaDescription    :
MediaType           :
Model               :
Name                :
OtherIdentifyingInfo :
PartNumber          :
PoweredOn           :
Removable           :
Replaceable         :
SerialNumber        : ACE4_2E81_7500_7AD8.
SKU                 :
Status              :
Tag                 : \\.\PHYSICALDRIVE0
Version             :
WriteProtectOn      :
PSComputerName      : W10BZMM6S2
```

FIG. 3

```
PS C:\Users\lakshmi_nalam> Get-WMIObject win32_keyboard

__GENUS                     : 2
__CLASS                     : Win32_Keyboard
__SUPERCLASS                : CIM_Keyboard
__DYNASTY                   : CIM_ManagedSystemElement
__RELPATH                   : Win32_Keyboard.DeviceID="HID\\CONVERTEDDEVICE&COL01
                              \\5&2C48E802&0&0000"
__PROPERTY_COUNT            : 23
__DERIVATION                : {CIM_Keyboard, CIM_UserDevice, CIM_LogicalDevice,
                              CIM_LogicalElement...}
__SERVER                    : W10BZMM6S2
__NAMESPACE                 : root\cimv2
__PATH                      : \\W10BZMM6S2\root\cimv2:Win32_Keyboard.DeviceID=
                              "HID\\CONVERTEDDEVICE&COL01\\5&2C48E802&0&0000"
Availability                :
Caption                     : Enhanced (101- or 102-key)
ConfigManagerErrorCode      : 0
ConfigManagerUserConfig     : False
CreationClassName           : Win32_Keyboard
Description                 : HID Keyboard Device
DeviceID                    : HID\CONVERTEDDEVICE&COL01\5&2C48E802&0&0000
ErrorCleared                :
ErrorDescription            :
InstallDate                 :
IsLocked                    :
LastErrorCode               :
Layout                      : 00000409
Name                        : Enhanced (101- or 102-key)
NumberOfFunctionKeys        : 12
Password                    :
PNPDeviceID                 : HID\CONVERTEDDEVICE&COL01\5&2C48E802&0&0000
PowerManagementCapabilities :
PowerManagementSupported    : False
Status                      : OK
StatusInfo                  :
SystemCreationClassName     : Win32_ComputerSystem
SystemName                  : W10BZMM6S2
PSComputerName              : W10BZMM6S2

__GENUS                     : 2
__CLASS                     : Win32_Keyboard
__SUPERCLASS                : CIM_Keyboard
__DYNASTY                   : CIM_ManagedSystemElement
__RELPATH                   : Win32_Keyboard.DeviceID="ACPI\\DLLK087D\\4&1D596F9F&0"
__PROPERTY_COUNT            : 23
__DERIVATION                : {CIM_Keyboard, CIM_UserDevice, CIM_LogicalDevice,
                              CIM_LogicalElement...}
__SERVER                    : W10BZMM6S2
__NAMESPACE                 : root\cimv2
__PATH                      : \\W10BZMM6S2\root\cimv2:Win32_Keyboard.DeviceID=
                              "ACPI\\DLLK087D\\4&1D596F9F&0"
Availability                :
```

FIG. 4

```
Caption                    : Enhanced (101- or 102-key)
ConfigManagerErrorCode     : 0
ConfigManagerUserConfig    : False
CreationClassName          : Win32_Keyboard
Description                : Standard PS/2 Keyboard
DeviceID                   : ACPI\DLLK087D\4&1D596F9F&0
ErrorCleared               :
ErrorDescription           :
InstallDate                :
IsLocked                   :
LastErrorCode              :
Layout                     : 00000409
Name                       : Enhanced (101- or 102-key)
NumberOfFunctionKeys       : 12
Password                   :
PNPDeviceID                : ACPI\DLLK087D\4&1D596F9F&0
PowerManagementCapabilities :
PowerManagementSupported   : False
Status                     : OK
StatusInfo                 :
SystemCreationClassName    : Win32_ComputerSystem
SystemName                 : W10BZMM6S2
PSComputerName             : W10BZMM6S2
```

FIG. 5

```
PS C:\Users\lakshmi_nalam> Get-WMIObject Win32_BaseBoard

Manufacture  : Dell Inc.
Model        :
Name         : Base Board
SerialNumber : /BZMM6S2/CNCMK008CB002B/
SKU          :
Product      : 0NFGCT
```

DETECTION OF MODIFICATION TO SYSTEM CONFIGURATION

FIELD

The field relates generally to information processing systems such as computing devices, and more particularly to detection of modifications made to configurations of such computing devices.

BACKGROUND

Businesses purchase systems such as, but not limited to, computing devices (e.g., personal computer, laptop, notebook, etc.) in large volumes to ensure that productivity and business continuity are not affected. Individual users may purchase systems for education, entertainment, gaming, and so on. Systems can be purchased either directly from the manufacturer (e.g., original equipment manufacturer or OEM) or indirectly through various retail sales channels. The systems that ship out of the manufacturer's factory undergo multiple hand-offs before they reach the purchasers. During these hand-offs, the system may be modified, e.g., altered (e.g., hardware configuration upgrade/downgrade) or tampered with (e.g., theft of components), without either the purchaser or manufacturer realizing it. The purchaser is unaware that the hardware configuration has changed after it was shipped out of the system manufacturer's factory. The system manufacturer may not be aware that the retailer or vendor has changed the original configuration of the system. Some hardware changes may impact the warranty status of the system and its hardware components.

SUMMARY

Illustrative embodiments provide techniques for detecting a modification to a configuration of a system. While illustrative embodiments are well suited for use with systems such as computing devices, embodiments in general are not necessarily limited to any particular type of system.

For example, in one illustrative embodiment, a method comprises the step of collecting a first data set for a system at a first time instance, wherein the first data set comprises inventory data for a configuration of the system present at the first time instance. The method then compares the first data set to a second data set, wherein the second data set comprises inventory data for a configuration of the system present at a second time instance. The method then obtains a third data set based on the comparison of the first data set and the second data set, wherein the third data set comprises data indicative of any differences between the inventory data for the configuration of the system present at the first time instance and the inventory data for the configuration of the system present at the second time instance.

Advantageously, illustrative embodiments provide an indication that the system was modified between the first time instance and the second time instance. In this way, an owner of the system can be notified and/or a manufacturer of the system can take remedial action against one or more entities who had possession of the system prior to delivery to the owner.

Further illustrative embodiments are provided in the form of a non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3 illustrates a second example of information collection for modification detection according to an illustrative embodiment.

DETAILED DESCRIPTION

Illustrative embodiments will be described herein with reference to exemplary information processing systems and associated host devices, storage devices, network devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

As mentioned above in the background section, systems such as computing devices that ship out of a manufacturer's factory undergo multiple hand-offs before reaching the purchaser. To complicate matters, the purchaser, who can be a customer or a vendor, can purchase computing devices from various sources such as, but not limited to, the manufacturer's website, e-commerce platforms, retailers or distributors, third-party vendors, stores, etc. Furthermore, computing devices purchased directly from the manufacturer's website are shipped to the customer or vendors via logistics partners. A computing device can take several days before it reaches the recipient (customer or vendor). Computing devices purchased from other sources (e.g., e-commerce platforms, retailers, vendors, or stores) may remain in the warehouse or shop floor for several weeks to months. There is a possibility that the hardware components in the computing devices may be removed, removed and replaced, or newly added while the computing device is in transit or while it is in the warehouse. In some scenarios, retailers, distributors, or third-party vendors may intentionally make these changes to the systems.

In general, most customers and vendors do not pay attention to verify the hardware components before they start using the computing device for the first-time. After using their computing device for a while, they may come across issues such as overheating of the computing device. When they contact technical support for a resolution, they may be informed that they are not the first owner of the computing device and that the ownership of the computing device must be transferred to them to obtain the warranty benefits. Technical support will inform the customer about the warranty status of the part (e.g., cooling fan) and may also let them know that the part has a problem/service history and hence must be replaced. In such a scenario, the customer may be confused and frustrated as they purchased a new computing device and they may be surprised to learn that the part had a problem history.

Currently, there is no automated method by which a customer can identify if the new computing device they purchased was previously modified by tampering or otherwise by parts replacement/removal. Also, when a used computing device is handed off at a service center for repairs, it is not easy for customers to identify if the hardware components were removed or removed and replaced.

Illustrative embodiments overcome the above and other drawbacks by providing techniques for modification detection for configurations of systems such as, but not limited to, computing devices. More particularly, illustrative embodiments provide an automated methodology for determining if the configuration of the system has changed after the system was shipped out of the factory. The functionality benefits the purchaser at first-time use to know if the system has been tampered with or otherwise altered, and the system manufacturer to identify the possible source of the hardware change in order to be able to take necessary action on the retailer or vendor.

Figure 1:
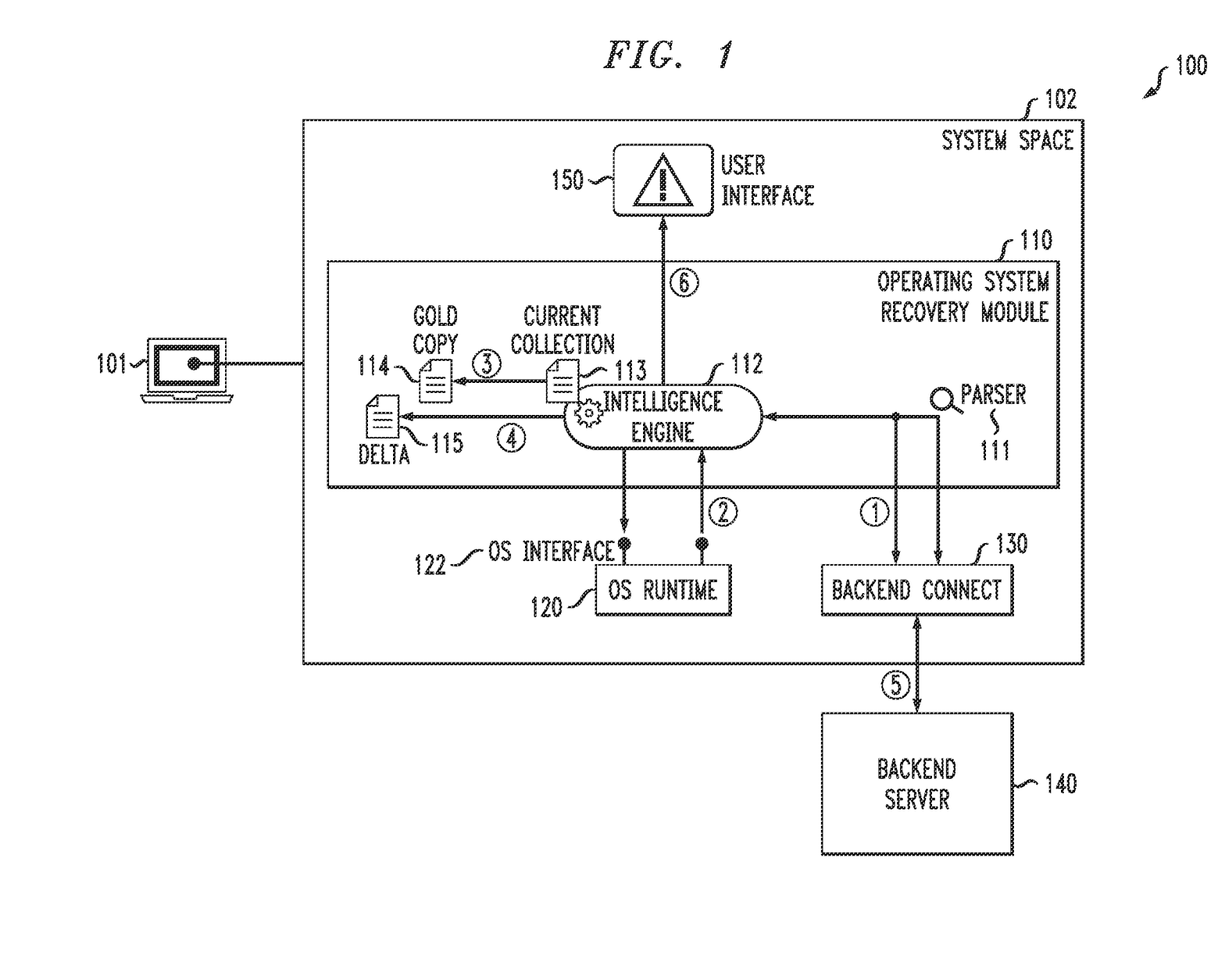
FIG. 1 illustrates a computing device environment with modification detection functionality according to an illustrative embodiment.

FIG. 1 illustrates a computing device environment 100 with modification detection functionality according to an illustrative embodiment. More particularly, computing device environment 100 in FIG. 1 shows a computing device 101 and its associated system space 102 (e.g., internal to the computing device 101) with configuration modification detection functionality. System space 102 comprises an operating system (OS) recovery module 110, an operating system (OS) runtime 120 with an OS interface 122, a backend connect interface 130, and a user interface 150. Backend connect interface 130 is operatively coupled to a backend server 140. OS recovery module 110 comprises a parser 111, an intelligence engine 112, a current collection 113, a gold copy 114, and a delta 115, as will be further explained. The term "system space" as illustratively used herein refers to memory/storage (volatile and/or non-volatile) and/or processor (runtime) environments associated with the computing device 101.

In one or more illustrative embodiments, OS runtime 120 comprises a Microsoft Windows WinRT runtime with an WinRT interface as OS interface 122. Further, in one or more illustrative embodiments, backend connect interface 130 comprises BIOSConnect (commercially available from Dell Inc., Hopkinton MA). Still further, in one or more illustrative embodiments, OS recovery module 110 comprises an adapted OS recovery product such as, but not limited to, SupportAssist OS Recovery (commercially available from Dell Inc., Hopkinton MA). SupportAssist OS Recovery is a pre-boot recovery environment that includes tools for diagnosing and troubleshooting hardware and software issues before the system boots to the operating system.

As will be further explained in the steps below, OS recovery module 110 in computing device 101 enables determination of the whether the components of computing device 101 have changed since the system was shipped from the manufacturer. The numbers 1-6 in FIG. 1 correspond to the following steps 1-6.

Step 1. OS recovery module 110 connects via backend connect interface 130 to backend server 140. It is to be understood that backend server 140 can be a server operated by the original equipment manufacturer (OEM) that manufactured computing device 101. More particularly, intelligence engine 112 collects information from backend server 140 about computing device 101 and its individual components (e.g., motherboard, keyboard, hard drive, etc.). Information collected from backend server 140 includes a universally-unique identifier (UUID) for each component and inventory information. Inventory information can also include: system and/or component purchase dates; age of components (e.g., based on purchase order information); warranty details; warranty remaining duration; and repair cycles of system and/or components based on the support history and previously obtained information. Parser 111 parses at least a portion of the information received from backend server 140 and extracts the UUID and inventory information for each component of computing device 101. The UUID and inventory information is referred to as gold copy 114 and is intended to represent the configuration of the components of computing device 101 when it left the OEM factory.

Step 2. Further, intelligence engine 112 queries OS runtime 120 via OS interface 122 to collect current information (UUIDs and inventory information) about the components that are currently in computing device 101. This information, referred to as current collection 113, is collected every time computing device 101 is powered up resulting in the data of current collection 113 being overwritten with the latest information.

Figure 2:
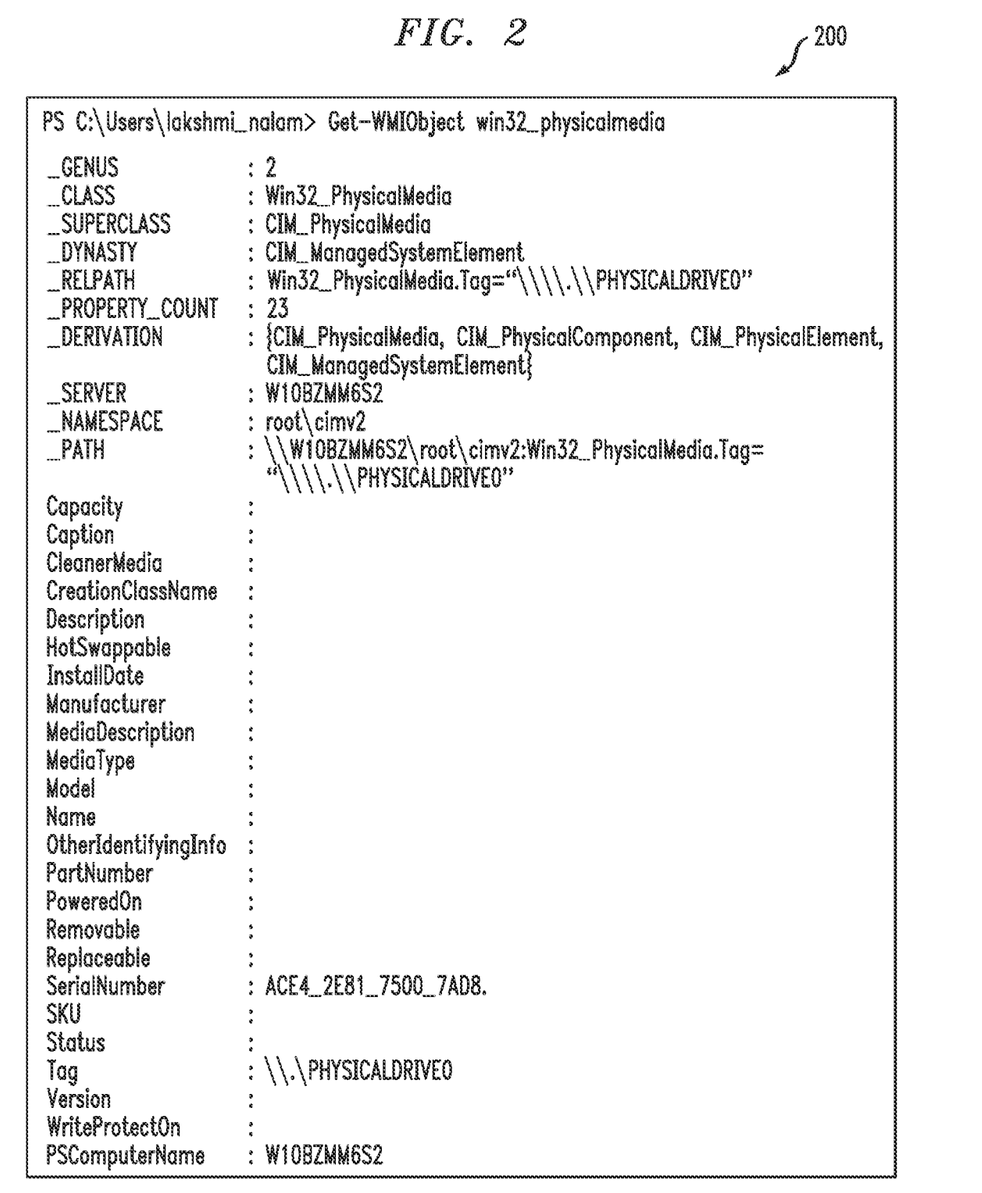
FIG. 2 illustrates a first example of information collection for modification detection according to an illustrative embodiment.
Figure 4:
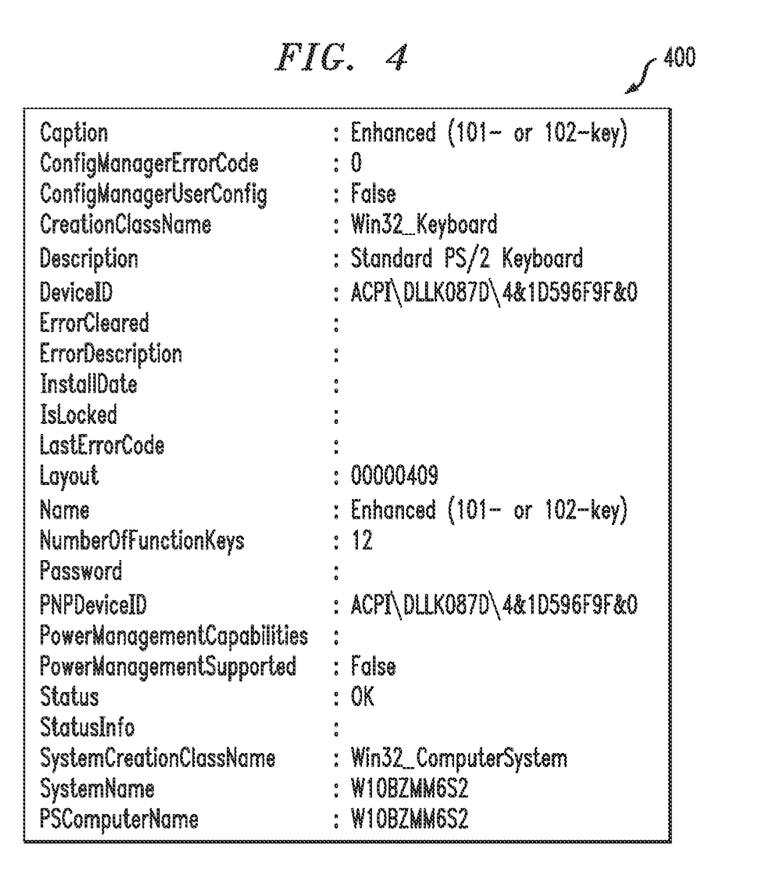
FIG. 4 illustrates a third example of information collection for modification detection according to an illustrative embodiment.
Figure 5:
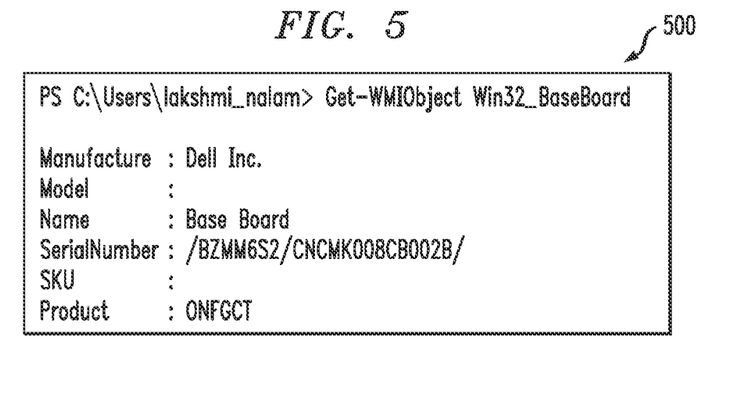
FIG. 5 illustrates a fourth example of information collection for modification detection according to an illustrative embodiment.

Note that FIGS. 2-5 illustrate examples of commands/requests that can be issued by intelligence engine 112 to collect information from OS runtime 120 and/or backend server 140. FIG. 2 illustrates an example 200 of a PowerShell command used to gather hard drive information. FIGS. 3 and 4 illustrate examples 300 and 400 of a PowerShell command used to gather keyboard information. FIG. 5 illustrates an example 500 of a PowerShell command used to gather motherboard information.

Returning now to FIG. 1:

Step 3. Intelligence engine 112 compares current collection 113 with gold copy 114 to determine if each component in computing device 101 is the same as it was shipped from the OEM or if it has been changed (removed or swapped). The comparison can include checking for the same UUID for a given component in current collection 113 and gold copy 114, as well as consistency between other inventory information for the given component. Any differences between current collection 113 and gold copy 114 are stored in delta 115.

Note that, on first-time system use, when a customer turns on (powers on) computing device 101 for the first-time, based on the ownership date (if the first-time boot is set), the information available from backend server 140 is treated as the gold copy. The information available from backend server 140 is a collection that is run for the system before it is shipped. Before the system boots, this information is compared with the current inventory information gathered by OS recovery module 110. If it is determined that there is a mismatch, the customer is notified immediately. This also helps the manufacturer to blacklist any retailer, distributor, or third-party vendor that performed an unauthorized modification to computing device 101 after it left the factory but before it reached the customer. Note then, for subsequent system use, the locally available collection is used as the gold copy. In the case of motherboard replacement, the first boot time is set, but the locally available collection is treated as the gold copy.

It is to be appreciated that "Ownership Date" is a field in the BIOS (basic input-output system) setup that records the system's first power on date after it was shipped. If this field has not been set, the "First Power On Date" page will appear in the Maintenance page and it will provide a "Set Ownership Date" check box. The "First Power On Date" page will be hidden if the Ownership Date has been set. When the "Set Ownership Date" check box is checked, the ownership date will be set to the current date.

Step 4. Intelligence engine 112 stores delta 115 in a file so that at any time it can determine the difference between gold copy 114 and the changes in computing device 101 after it went offline.

Step 5. Delta 115 is uploaded by intelligence engine 112 to backend server 140 via backend connect interface 130.

Step 6. Delta 115 (as well as current collection 113 and gold copy 114 if needed) is provided to user interface 150 so that user can view the information.

Figure 6:
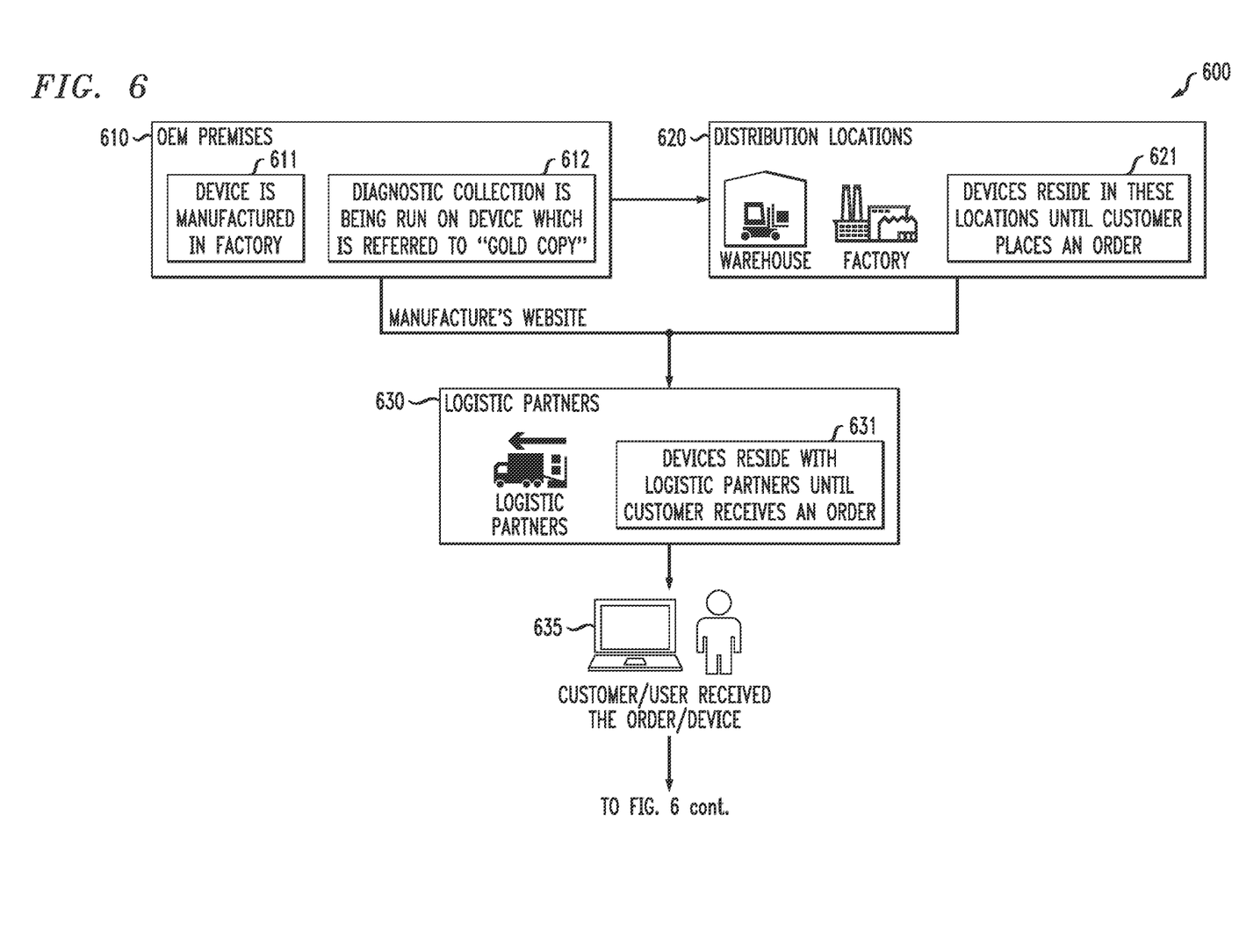
FIG. 6 illustrates a computing device management methodology with modification detection functionality according to an illustrative embodiment.

Turning now to FIG. 6, a computing device management methodology 600 with modification detection functionality is shown according to an illustrative embodiment. More particularly, FIG. 6 shows the manufacturing and distribution environment within which a system such as computing device (e.g., 101 of FIG. 1) is managed. As shown, the environment comprises OEM premises 610, distribution locations 620 (e.g., e-commerce platforms, retailers, vendors, stores, factories, warehouses, etc.), logistics partners 630, customer 635, OS recovery module 640 (e.g., 110 of FIG. 1), and OEM backend server 660 (e.g., 140 of FIG. 1).

As shown in OEM premises 610, the computing device is manufactured in step 611. The computing device is sent to one of distribution locations 620 and resides there (step 621) until a customer places an order. UUID and other inventory information for the computing device is collected after it is manufactured and ready to ship (step 612). This collected information serves as the gold copy (e.g., 114 of FIG. 1) and is stored at or otherwise maintained by OEM premises 610. Assume now that customer 635 purchases the computing device directly from the manufacturer's website or from some other purchase source (e.g., e-commerce platforms, stores, etc.)

The computing device resides (step 631) with one of the logistics partners 630 until it is delivered to customer 635. Customer 635 receives the computing device which has OS recovery module 640 with modification detection functionality according to an illustrative embodiment. Customer 635 powers on the computing device (step 641) and the modification detection functionality starts to operate. In step 642, the intelligence engine (e.g., 112 of FIG. 1) within OS recovery module 640 uses an OS interface (e.g., 122 of FIG. 1) to gather the inventory information of the computing device. In step 643, a built-in parser (e.g., 111 of FIG. 1) within OS recovery module 640 parses the inventory information and gathers the UUID information of each hardware component.

If step 644 determines that this is the first-time the computing device powers on (which can be determined using the ownership date in BIOS), then in step 645, the intelligence engine compares the current collection with the gold copy obtained from OEM backend server 660 which is located at or otherwise managed by OEM premises 610.

If step 644 determines that this is not the first time the computing device powers on, then in step 646, the intelligence engine compares the current collection with the gold copy in the OS recovery module 640 (customer premises/environment).

Step 647 determines whether or not a mismatch is found during the comparison. If there is a mismatch, step 648 reports it to the OEM so the OEM can take some remedial or punitive action against the entity that modified the computing device. For example, if this is the first-time the computing device powers on, and the hardware configuration change is noted, the OEM can blacklist the vendor for tampering with the computing device. The mismatch or difference between the collections, referred to as the delta (e.g., delta 115 of FIG. 1), is uploaded to OEM backend server 660 in step 649.

In step 650, the delta is also presented to user via a user interface (e.g., 150 of FIG. 1) so that the user can act immediately. For example, the user can see both the original part and new part information on the user interface as well as other inventory information, e.g., UUIDs, warranty information, overall system configuration on the computing device. The delta information is available in the computing device for future reference of hardware configuration changes made to the computing device. As shown in step 651, the current collection is then referred as the gold copy for the next collection which is run when system re-starts.

Advantageously, as explained herein, illustrative embodiments provide techniques to determine, even before the operating system boots the first time, if the new system is modified with either old parts or parts different from what was shipped. By determining the delta between the current inventory collection and the gold copy, modification (e.g., tampering) is detected even before the system boots into the operating system.

Further, illustrative embodiments also determine the change in the inventory of a system (i.e., new or used) with the underlying operating system. By using the OS interface commands, changes in inventory of systems can be detected. The change can be identified when the system is powered on. The delta file (where the changes are recorded) is available and accessible at any time to determine the differences between the gold copy and the current collection.

Still further, illustrative embodiments enable determination of the source of tampering on the system and its individual components (e.g., distributor, retailer, service center, etc.). If a mismatch is identified between the shipped hardware configuration and the current configuration of a new system, the intelligence engine will notify the manufacturer that the system has been tampered with. This information will help the manufacturer determine the source of the tampering and a support ticket would be generated. The same information would be accessible to customer.

While the modification detection functionality described herein can be implemented in a wide variety of systems and environments, some exemplary use cases include, but are not limited to:

(i) Shipping. The system is shipped from the manufacturer's factory. During transit, the hardware components of the system are removed or removed and replaced (swapped) with old or inferior components.
(ii) Repair. The system is handed off at a service center for installing software or repairing a component. At the service center, hardware components of the system are removed or removed and replaced (swapped) with old or inferior components.
(iii) Return. The system is returned by the customer to the manufacturer citing dissatisfaction or other reasons. The new system is delivered to the customer successfully. The customer maliciously tampers the system and then returns it to the manufacturer.

Figure 7:
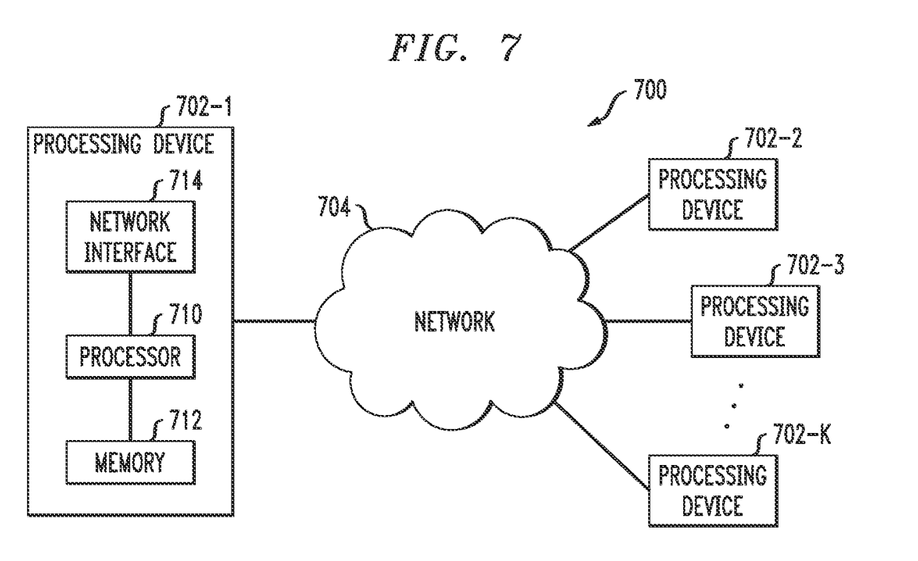
FIG. 7 illustrates a processing platform used to implement an information processing system for modification detection functionality for a computing device according to an illustrative embodiment.

FIG. 7 depicts a processing platform 700 used to implement improved data theft protection according to an illustrative embodiment. More particularly, processing platform 700 is a processing platform on which a computing environment with functionalities described herein (e.g., FIGS. 1-6 and otherwise described herein) can be implemented.

The processing platform 700 in this embodiment comprises a plurality of processing devices, denoted 702-1, 702-2, 702-3, . . . 702-K, which communicate with one another over network(s) 704. By way of one example only, in one illustrative embodiment, processing devices 702-1, 702-2, 702-3, . . . 702-K can respectively correspond with OEM premises 610, distribution locations 620, logistics partners 630, customer 635, OS recovery module 640, and OEM backend server 660. Further, in the context of FIG. 1, one or more of processing devices 702-1, 702-2, 702-3, . . . 702-K can correspond to computing device 101, while one or more other of processing devices 702-1, 702-2, 702-3, . . . 702-K can correspond to backend server 140. Alternative configurations can be implemented with processing platform 700.

It is to be appreciated that the methodologies described herein may be executed in one such processing device 702, or executed in a distributed manner across two or more such processing devices 702. It is to be further appreciated that a server, a client device, a computing device or any other processing platform element may be viewed as an example of what is more generally referred to herein as a "processing device." As illustrated in FIG. 7, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architectures depicted in the figures can comprise one or more of such processing devices 702 shown in FIG. 7. The network(s) 704 represent one or more communications networks that enable components to communicate and to transfer data therebetween, as well as to perform other functionalities described herein.

The processing device 702-1 in the processing platform 700 comprises a processor 710 coupled to a memory 712. The processor 710 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 710. Memory 712 (or other storage device) having such program code embodied therein is an example of what is more generally referred to herein as a processor-readable storage medium. Articles of manufacture comprising such computer-readable or processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 712 may comprise electronic memory such as random-access memory (RAM), read-only memory (ROM) or other types of memory, in any combination. The one or more software programs when executed by a processing device such as the processing device 702-1 causes the device to perform functions associated with one or more of the components/steps of system/methodologies in FIGS. 1-6. One skilled in the art would be readily able to implement such software given the teachings provided herein. Other examples of processor-readable storage media embodying embodiments of the invention may include, for example, optical or magnetic disks.

Processing device 702-1 also includes network interface circuitry 714, which is used to interface the device with the network(s) 704 and other system components. Such circuitry may comprise conventional transceivers of a type well known in the art.

The other processing devices 702 (702-2, 702-3, . . . 702-K) of the processing platform 700 are assumed to be configured in a manner similar to that shown for processing device 702-1 in the figure.

The processing platform 700 shown in FIG. 7 may comprise additional known components such as batch processing systems, parallel processing systems, physical machines, virtual machines, virtual switches, storage volumes, etc. Again, the particular processing platform shown in this figure is presented by way of example only, and the system shown as 700 in FIG. 7 may include additional or alternative processing platforms, as well as numerous distinct processing platforms in any combination.

Also, numerous other arrangements of servers, clients, computers, storage devices or other components are possible in processing platform 700. Such components can communicate with other elements of the processing platform 700 over any type of network, such as a wide area network (WAN), a local area network (LAN), a satellite network, a telephone or cable network, or various portions or combinations of these and other types of networks.

Furthermore, it is to be appreciated that the processing platform 700 of FIG. 7 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 700 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

The particular processing operations and other system functionality described in conjunction with FIGS. 1-7 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention.

What is claimed is:

1. An apparatus comprising:
   at least one processing device comprising a processor coupled to a memory;
   the at least one processing device being configured to:
   collect a first data set for a system at a first time instance, wherein the first data set comprises inventory data for a configuration of the system present at the first time instance;
   compare the first data set to a second data set, wherein the second data set comprises inventory data for a configuration of the system present at a second time instance;
   obtain a third data set based on the comparison of the first data set and the second data set, wherein the third data set comprises data indicative of any differences between the inventory data for the configuration of the system present at the first time instance and the inventory data for the configuration of the system present at the second time instance;
   automatically cause a notification to an owner of the system of any differences between the inventory data for the configuration of the system present at the first time instance and the inventory data for the configuration of the system present at the second time instance; and
   cause an upload of the third data set to a backend server of a manufacturer of the system;
   wherein any differences between the inventory data for the configuration of the system present at the first time instance and the inventory data for the configuration of the system present at the second time instance indicate that the system was modified between the first time instance and the second time instance.

2. The apparatus of claim 1, wherein the first time instance is contemporaneous with a powering on of the system, and the second time instance is prior to the powering on of the system.

3. The apparatus of claim 1, wherein the at least one processing device is further configured to cause one or more actions to be taken based on any differences indicated in the third data set.

4. The apparatus of claim 1, wherein the collecting and comparing steps are performed prior to booting of an operating system of the system.

5. The apparatus of claim 2, wherein when the first time instance is the first time the system is powered on, the first data set is a data set obtained from the system and the second data set is a data set obtained from a source remote from the system.

6. The apparatus of claim 3, wherein the one or more actions comprise taking a remedial action by the manufacturer of the system against one or more entities who had possession of the system prior to delivery to the owner.

7. The apparatus of claim 5, wherein the source remote from the system is a manufacturer of the system.

8. The apparatus of claim 5, wherein when the first time instance is not the first time the system is powered on, the first data set and the second data set are data sets obtained within the system.

9. The apparatus of claim 8, wherein the at least one processing device is further configured to record a date the first time the system is powered on.

10. A method comprising:
    collecting a first data set for a system at a first time instance, wherein the first data set comprises inventory data for a configuration of the system present at the first time instance;
    comparing the first data set to a second data set, wherein the second data set comprises inventory data for a configuration of the system present at a second time instance;
    obtaining a third data set based on the comparison of the first data set and the second data set, wherein the third data set comprises data indicative of any differences between the inventory data for the configuration of the system present at the first time instance and the inventory data for the configuration of the system present at the second time instance;
    automatically causing a notification to an owner of the system of any differences between the inventory data for the configuration of the system present at the first time instance and the inventory data for the configuration of the system present at the second time instance; and
    causing an upload of the third data set to a backend server of a manufacturer of the system;
    wherein any differences between the inventory data for the configuration of the system present at the first time instance and the inventory data for the configuration of the system present at the second time instance indicate that the system was modified between the first time instance and the second time instance.

11. The method of claim 10, wherein the first time instance is contemporaneous with a powering on of the system, and the second time instance is prior to the powering on of the system.

12. The method of claim 10, further comprising causing one or more actions to be taken based on any differences indicated in the third data set.

13. The method of claim 11, wherein when the first time instance is the first time the system is powered on, the first data set is a data set obtained from the system and the second data set is a data set obtained from a source remote from the system.

14. The method of claim 13, wherein the source remote from the system is a manufacturer of the system.

15. The method of claim 13, wherein when the first time instance is not the first time the system is powered on, the first data set and the second data set are data sets obtained within the system.

16. The method of claim 15, wherein the at least one processing device is further configured to record a date the first time the system is powered on.

17. A computer program product comprising a non-transitory processor-readable storage medium having stored therein program code of one or more software programs, wherein the program code when executed by at least one processing device causes the at least one processing device to perform steps of:
collecting a first data set for a system at a first time instance, wherein the first data set comprises inventory data for a configuration of the system present at the first time instance;
comparing the first data set to a second data set, wherein the second data set comprises inventory data for a configuration of the system present at a second time instance;
obtaining a third data set based on the comparison of the first data set and the second data set, wherein the third data set comprises data indicative of any differences between the inventory data for the configuration of the system present at the first time instance and the inventory data for the configuration of the system present at the second time instances;
automatically causing a notification to an owner of the system of any differences between the inventory data for the configuration of the system present at the first time instance and the inventory data for the configuration of the system present at the second time instance; and
causing an upload of the third data set to a backend server of a manufacturer of the system;
wherein any differences between the inventory data for the configuration of the system present at the first time instance and the inventory data for the configuration of the system present at the second time instance indicate that the system was modified between the first time instance and the second time instance.

18. The computer program product of claim 17, wherein the first time instance is contemporaneous with a powering on of the system, and the second time instance is prior to the powering on of the system.

19. The computer program product of claim 18, wherein when the first time instance is the first time the system is powered on, the first data set is a data set obtained from the system and the second data set is a data set obtained from a source remote from the system.

20. The computer program product of claim 19, wherein the source remote from the system is a manufacturer of the system.

* * * * *

UNITED STATES PATENT AND TRADEMARK OFFICE
CERTIFICATE OF CORRECTION

PATENT NO. : 11,954,004 B2
APPLICATION NO. : 17/505901
DATED : April 9, 2024
INVENTOR(S) : Parminder Singh Sethi et al.

It is certified that error appears in the above-identified patent and that said Letters Patent is hereby corrected as shown below:

In the Claims

Column 12, Claim 17, Line 7, please delete "second time instances;" and insert therefor --second time instance;--

Signed and Sealed this
Seventh Day of May, 2024

Katherine Kelly Vidal
Director of the United States Patent and Trademark Office